(12) United States Patent
Kobayashi

(10) Patent No.: US 12,205,337 B2
(45) Date of Patent: Jan. 21, 2025

(54) IMAGE CAPTURING APPARATUS CAPABLE OF RECOGNIZING RECOGNITION TARGET WITH HIGH ACCURACY, METHOD OF CONTROLLING SAME, AND STORAGE MEDIUM

(71) Applicant: CANON KABUSHIKI KAISHA, Tokyo (JP)

(72) Inventor: Takashi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 18/193,987

(22) Filed: Mar. 31, 2023

(65) Prior Publication Data
US 2023/0326164 A1 Oct. 12, 2023

(30) Foreign Application Priority Data

Apr. 11, 2022 (JP) ................................ 2022-065101

(51) Int. Cl.
| | |
|---|---|
| G06V 10/147 | (2022.01) |
| G06V 10/764 | (2022.01) |
| G06V 10/776 | (2022.01) |
| G06V 10/94 | (2022.01) |
| G06V 10/98 | (2022.01) |
| H04N 23/61 | (2023.01) |

(Continued)

(52) U.S. Cl.
CPC .......... *G06V 10/147* (2022.01); *G06V 10/776* (2022.01); *G06V 10/955* (2022.01); *G06V 10/98* (2022.01); *H04N 23/61* (2023.01); *H04N 23/667* (2023.01); *H04N 23/81* (2023.01); *G06V 10/764* (2022.01)

(58) Field of Classification Search
CPC .. G06V 10/147; G06V 10/776; G06V 10/955; G06V 10/98; G06V 10/764; H04N 23/61; H04N 23/667; H04N 23/81; H04N 23/665
See application file for complete search history.

(56) References Cited

U.S. PATENT DOCUMENTS

| | | | |
|---|---|---|---|
| 9,253,374 B2 | 2/2016 | Kobayashi | |
| 11,356,600 B2* | 6/2022 | Yadav | .................... G06N 20/00 |
| 2021/0289131 A1* | 9/2021 | Yadav | .................... G06N 20/00 |

FOREIGN PATENT DOCUMENTS

| | | | |
|---|---|---|---|
| JP | 6697042 B2 | 5/2020 | |
| JP | 6937443 B2 | 9/2021 | |

* cited by examiner

*Primary Examiner* — Nicholas G Giles
(74) *Attorney, Agent, or Firm* — Carter, DeLuca & Farrell LLP

(57) ABSTRACT

An image capturing apparatus includes an image sensor section and a signal processor for processing an image input from the image sensor section via a signal line. A control arithmetic unit switches the signal processor to a recognition mode or a learning mode. The image sensor section includes an image capturing section for generating the image, and a sensor recognition section for performing recognition processing based on the image. The signal processor includes a recognition section for performing, in the recognition mode, recognition processing by inputting the image input from the image sensor section to a learning model, and a learning section for performing, in the learning mode, machine learning of the learning model based on a recognition result obtained by the sensor recognition section and the image input from the image sensor section.

17 Claims, 9 Drawing Sheets

(51) Int. Cl.
*H04N 23/667* (2023.01)
*H04N 23/81* (2023.01)

FIG. 4

|  | RECOGNITION SECTION IN SENSOR | RECOGNITION SECTION IN SIGNAL PROCESSOR |
| --- | --- | --- |
| RECOGNITION PERFORMANCE | LOW | HIGH |
| PARTIAL RECOGNITION | DETECTABLE IN MIDDLE OF IMAGE READING | DETECTION USING WHOLE IMAGE |
| RECOGNITION LAG | SMALL | LARGE |
| POWER CONSUMPTION | SMALL | LARGE |
| HEAT GENERATION | IMAGE SENSOR SECTION | IMAGE PROCESSOR |

FIG. 8

|  | NORMAL IMAGE QUALITY | UNDER-BRIGHTNESS | OVER-BRIGHTNESS |
|---|---|---|---|
| RECOGNITION RESULT OBTAINED BY RECOGNITION SECTION | ○ | × | × |
| RECOGNITION RESULT OBTAINED BY SENSOR RECOGNITION SECTION | ○ | ○ | × |

FIG. 9

|  | NORMAL IMAGE QUALITY | UNDER-BRIGHTNESS | OVER-BRIGHTNESS |
|---|---|---|---|
| RECOGNITION RESULT OBTAINED BY RECOGNITION SECTION | ○ | ○ | ○ |
| RECOGNITION RESULT OBTAINED BY SENSOR RECOGNITION SECTION | ○ | ○ | × |

IMAGE CAPTURING APPARATUS CAPABLE OF RECOGNIZING RECOGNITION TARGET WITH HIGH ACCURACY, METHOD OF CONTROLLING SAME, AND STORAGE MEDIUM

BACKGROUND OF THE INVENTION

Field of the Invention

The present invention relates to an image capturing apparatus that is capable of recognizing a recognition target with high accuracy, a method of controlling the same, and a storage medium, and more particularly to an image capturing apparatus that has an image sensor section and a signal processor, arranged therein, a method of controlling the same, and a storage medium.

Description of the Related Art

In an image capturing apparatus represented by a recent digital camera, there is a case where high-level recognition processing using a neural network based on machine learning, such as deep neural network (DNN), is performed by a signal processor to meet demands of diversified and high-speed image processing. Further, in such an image capturing apparatus, there is also a case where an image capturing section and a recognition section are arranged in a single image sensor section, and image generation and image recognition are performed in the single image sensor section.

For example, Japanese Patent No. 6937443 proposes an image sensor section formed by laminating an image capturing section and a recognition section using deep learning, on a substrate.

Further, Japanese Patent No. 6697042 discloses a technique for evaluating the recognition accuracy of the recognition section in the above-mentioned image sensor section and changing a learning model used by the recognition section according to the evaluated recognition accuracy. The learning model in Japanese Patent No. 6697042 is stored in a storage section in advance, and the number of types of detection of an object as a detection target and the number of classification types are changed according to the evaluated recognition accuracy.

Incidentally, as mentioned in the beginning of the description, in the image capturing apparatus represented by a recent digital camera, a recognition section that performs high-level recognition processing is sometimes provided not only in the signal processor at a latter stage, but also in the image sensor section at a former stage. That is, the image capturing apparatus has two recognition sections, i.e. one in the image sensor section at the former stage and one in the signal processor at the latter stage. If the two recognition sections are provided, it is possible to make proper selective use of them according to conditions. However, the image sensor section and the signal processor are separate circuits, and the two recognition sections are not necessarily adapted to the same recognition target.

SUMMARY OF THE INVENTION

The present invention provides an image capturing apparatus capable of causing a signal processor that processes an image output from an image sensor section to recognize a recognition target with high accuracy, a method of controlling the same, and a storage medium.

In a first aspect of the present invention, there is provided an image capturing apparatus including an image sensor section and a signal processor configured to process an image input from the image sensor section via a signal line, including a switching unit configured to switch the signal processor to one of a recognition mode and a learning mode, wherein the image sensor section includes an image capturing unit configured to generate the image, and a first recognition unit configured to perform recognition processing based on the image, wherein the signal processor includes a second recognition unit configured to perform, in the recognition mode, recognition processing by inputting the image input from the image sensor section to a learning model, and a learning unit configured to perform, in the learning mode, machine learning of the learning model based on a recognition result obtained by the first recognition unit and the image input from the image sensor section.

In a second aspect of the present invention, there is provided a method of controlling an image capturing apparatus including an image sensor section and a signal processor configured to process an image input from the image sensor section via a signal line, including switching the signal processor to one of a recognition mode and a learning mode, generating the image in the image sensor section, performing recognition processing in the image sensor section based on the image, performing, when in the recognition mode, recognition processing in the signal processor by inputting the image input from the image sensor section to a learning model, and performing, when in the learning mode, machine learning of the learning model in the signal processor based on a result of recognition processing based on the image and the image input from the image sensor section.

According to the present invention, the signal processor that processes an image output from the image sensor section is capable of recognizing a recognition target with high accuracy.

Further features of the present invention will become apparent from the following description of exemplary embodiments (with reference to the attached drawings).

BRIEF DESCRIPTION OF THE DRAWINGS

FIG. 4 is a diagram showing comparison between a sensor recognition section that performs recognition processing in the image sensor section and a recognition section that performs recognition processing in the signal processor.

FIG. 8 is a table showing an example of comparison in recognition performance between the sensor recognition section and the recognition section according to the first embodiment of the present invention.

FIG. 9 is a table showing an example of comparison in the recognition performance between the sensor recognition section and the recognition section according to the first embodiment of the present invention.

DESCRIPTION OF THE EMBODIMENTS

The present invention will now be described in detail below with reference to the accompanying drawings showing embodiments thereof.

A first embodiment of the present invention will be described below.

Figure 1:
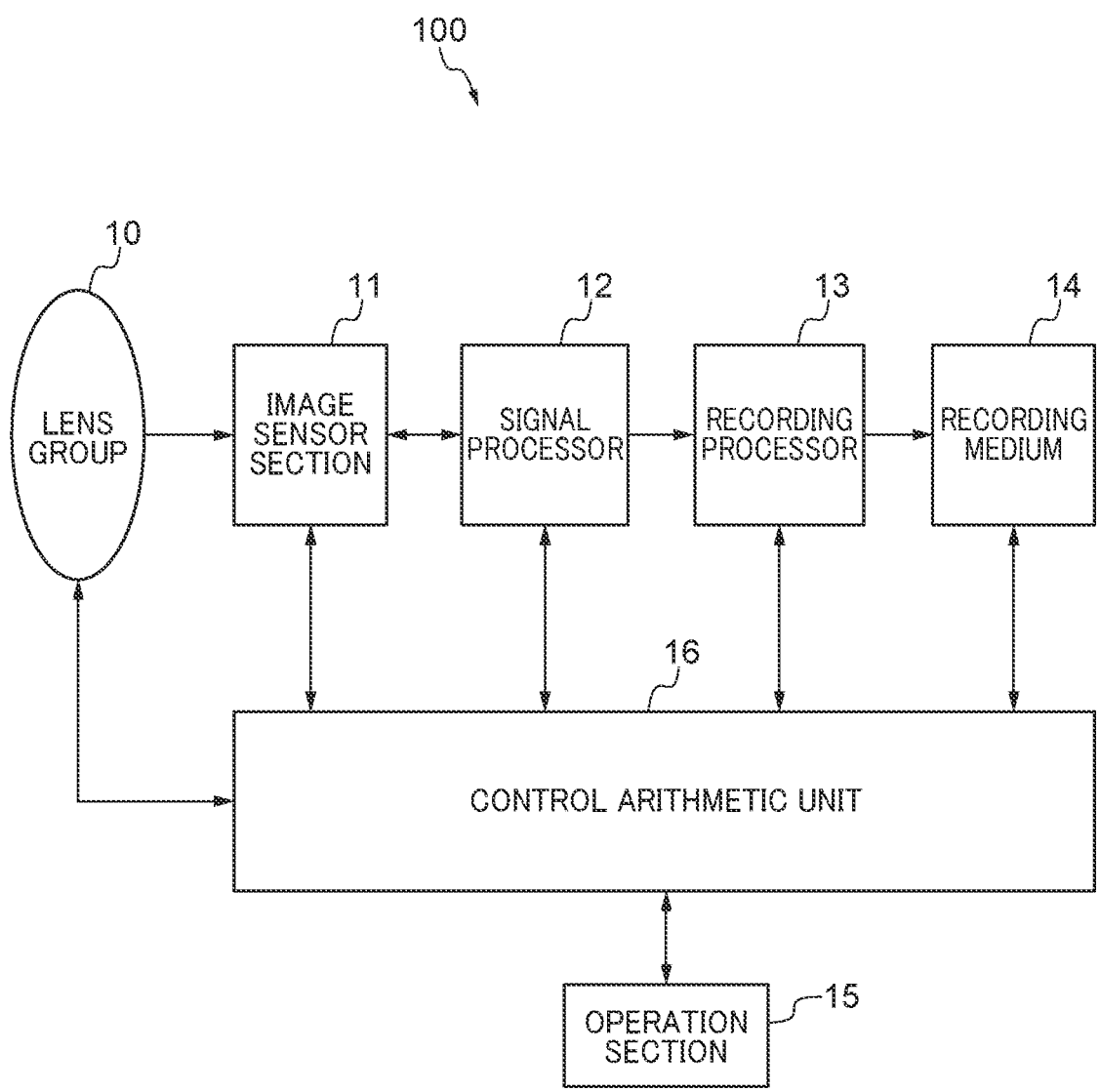
FIG. 1 is a schematic diagram showing a configuration of a digital camera as an image capturing apparatus according to a first embodiment of the present invention.

FIG. 1 is a schematic diagram showing a configuration of a digital camera 100 as an image capturing apparatus according to the present embodiment.

Referring to FIG. 1, the digital camera 100 includes a lens group 10, an image sensor section 11, a signal processor 12, a recording processor 13, a recording medium 14, an operation section 15, and a control arithmetic unit 16.

The lens group 10 represents a group of lenses that can be controlled so as to realize preferable image quality when an image is photographed by the digital camera 100. The lens group 10 includes a zoom lens, a focus lens, an image stabilization lens, a diaphragm, a neutral density (ND) filter, and so forth.

The image sensor section 11 receives a ray of light incident through the lens group 10 and performs photoelectrical conversion for converting light to an electrical signal in each of pixels on its imaging surface. Further, the image sensor section 11 converts the electrical signals obtained by photoelectrical conversion from analog to digital to thereby generate a digital image.

The signal processor 12 performs a variety of kinds of image processing on the digital image generated by the image sensor section 11. The image processing mentioned here refers to a variety of kinds of correction processing for realizing high image quality. Examples of the image processing include elimination of fixed pattern noise, demosaicing processing, development processing, brightness correction processing, color correction processing, geometrical deformation processing, edge emphasizing processing, gamma correction processing, contrast correction processing, aberration correction processing, and noise reduction processing. Further, the signal processor 12 performs not only the above-mentioned processing operations, but also recognition processing for detecting a main object area from an image, for the purpose of lens control, such as focusing and aperture control. Details of the processing operations performed in the image sensor section 11 and the signal processor 12, respectively, will be described hereinafter. The image on which image processing has been performed by the signal processor 12 is transmitted to the recording processor 13.

The recording processor 13 performs encoding on the image received from the signal processor 12 and transmits the encoded image to the recording medium 14.

The recording medium 14 may be a general-purpose recording medium which can be attached/removed to and from a general-purpose interface (not shown) included in the digital camera 100 or may be a storage device unremovably disposed in the digital camera 100 and having a fixed storage capacity. The recording medium 14 stores image data of encoded images transmitted thereto by writing the image data in a nonvolatile storage area.

The operation section 15 has receiving means for receiving an operation from a user on the digital camera 100 and transmitting means for transmitting an operation signal indicative of details of the received operation to the control arithmetic unit 16. The receiving means may be a mechanical button, or an electrostatic capacitance-type touch panel integrally formed with a display member, such as a liquid crystal. Further, the receiving means may be an external remote controller connected to a general-purpose terminal or a communication device from an external terminal, such as a smartphone wirelessly connected to the digital camera 100.

The control arithmetic unit 16 receives an operation signal transmitted from the transmitting means of the operation section 15, generates control information, and transmits the generated control information to the lens group 10, the image sensor section 11, the signal processor 12, the recording processor 13, and the recording medium 14. In a case where the receiving means of the operation section 15 is a touch panel integrally formed with the display member, the control arithmetic unit 16 transmits control information for displaying an image on the display member to the operation section 15.

Now, there will be described a flow of signals in the entire system of the digital camera 100, which is related to an operation for performing auto focusing in a switch 1 (SW1) state, referred to hereinafter, as a preliminary stage of a still image photographing by the digital camera 100. Not that in the following example, it is assumed that a release button is included in the receiving means of the operation section 15.

When half-pressing of the release button is detected, the operation section 15 transmits half-pressing information to the control arithmetic unit 16. When the half-pressing information is received from the operation section 15, the control arithmetic unit 16 determines that the digital camera 100 is in the SW1. In the SW1 state, to perform an operation of focusing on an object at maximum speed, it is necessary to obtain a brightness suitable for the focusing operation. Therefore, the control arithmetic unit 16 calculates correction values for correcting a control position of the diaphragm, exposure time, and brightness, so as to obtain brightness suitable for the focusing operation, and transmits the associated correction values to the lens group 10, the image sensor section 11, and the signal processor 12, respectively.

The signal processor 12 detects a position of a main object from each of sequentially captured images, calculates object coordinates and contrast information at coordinates around the object coordinates (hereinafter referred to as the "near-object contrast information"), and transmits the calculated information to the control arithmetic unit 16.

The control arithmetic unit 16 determines a degree of focusing on the object coordinates based on the near-object contrast information transmitted from the signal processor 12, generates focus control information according to the determined degree of focusing, and transmits the generated focus control information to the lens group 10 a plurality of times. The control arithmetic unit 16 performs image capturing whenever the focus lens included in the lens group 10 is driven according to transmission of the focus control information and causes the signal processor 12 to calculate the near-object contrast information for each captured image. The control arithmetic unit 16 determines whether or not the focus lens has reached an in-focus position based on the near-object contrast information calculated by the signal processor 12. If it is determined that focus lens has reached the in-focus position, the control arithmetic unit 16 issues a command for stopping the focus lens to the lens group 10 and prepares for a shift from an operation in the SW1 state to an operation in a switch 2 (SW2) state. Further, the control arithmetic unit 16 generates control information for the lens group 10, the image sensor section 11, and the signal processor 12, so as to change the brightness for the focusing operation to a brightness for still image photographing.

The description has been given of the general configuration and operation of the digital camera 100. Next, the internal operations of the image sensor section 11 and the signal processor 12 will be described.

Figure 2:
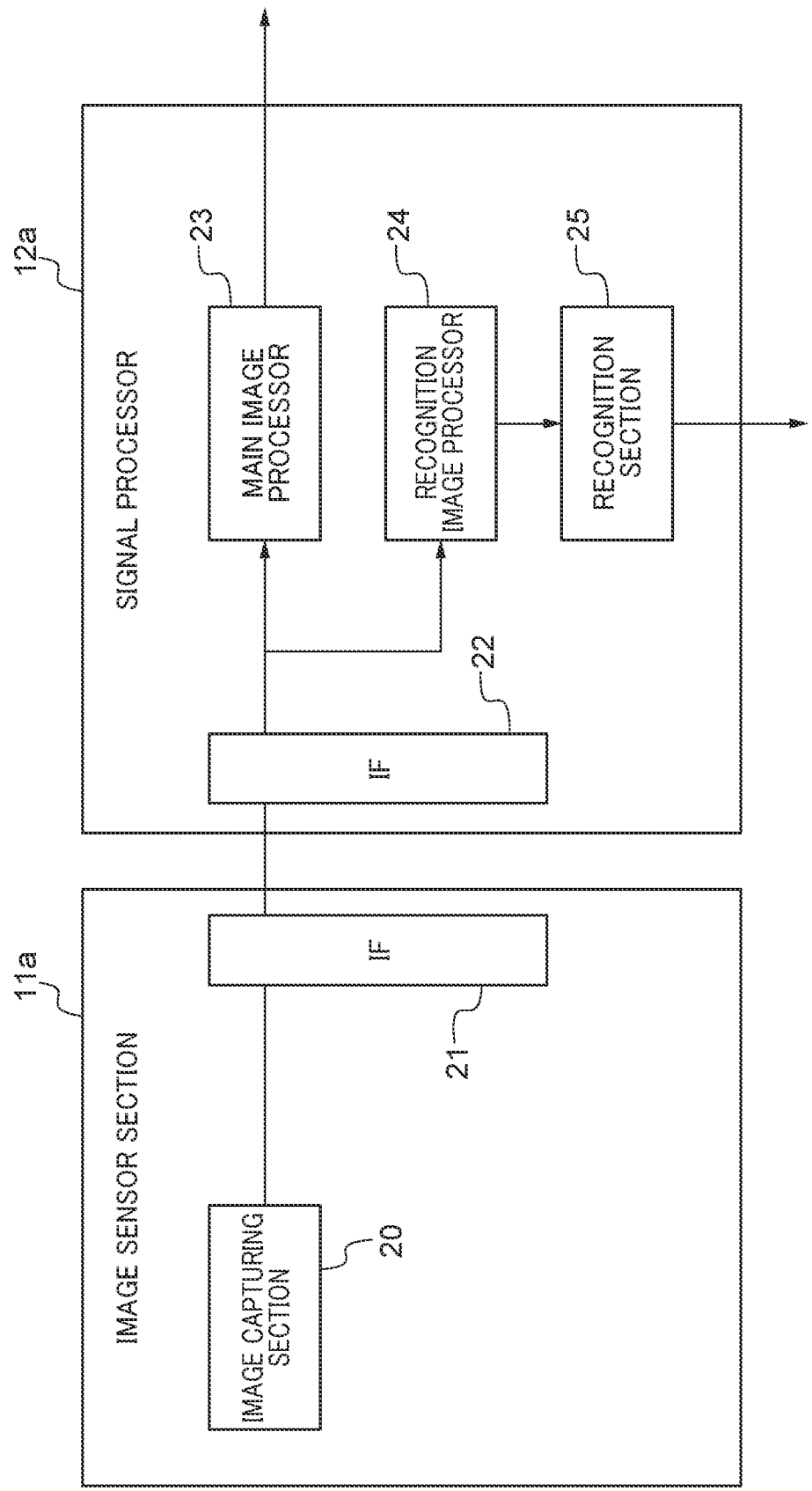
FIG. 2 is a diagram showing a data flow inside the conventional image sensor section and signal processor.

First, an image sensor section 11a and a signal processor 12a as the conventional components, which are arranged in the same positions as the image sensor section 11 and the signal processor 12 appearing in FIG. 1, will be described with reference to FIG. 2. FIG. 2 shows a data flow inside the conventional image sensor section 11a and signal processor 12a.

The image sensor section 11a includes an image capturing section 20 and an interface (IF) section 21. Further, the signal processor 12a includes an IF section 22, a main image processor 23, a recognition image processor 24, and a recognition section 25.

The image capturing section 20 (image capturing unit) in the image sensor section 11a photoelectrically converts received light to electrical signals and further converts the electrical signals from analog to digital to generate a digital image. The digital image output from the image capturing section 20 is transmitted to the IF section 22 in the signal processor 12a via the IF section 21. Here, the IF sections 21 and 22 may use general communication standards, such as low voltage differential signaling (LVDS) or sub LVDS, or may use any other special communication standards specific to the component elements. Further, although FIG. 2 shows an example in which communication between the IF sections 21 and 22 is performed via one signal line, image signals may be communicated in parallel at high speed via a plurality of signal lines.

The main image processor 23 in the signal processor 12a performs image processing on the image output from the image sensor section 11a to generate an image to be output to the recording processor 13. The image processing mentioned here includes a variety of kinds of image processing for converting an image in the Bayer array to an image which can be generally recorded and viewed. For example, the image processing includes processing for eliminating fixed pattern noise, demosaicing processing, color correction processing for adjusting the RGB balance, and gamma correction processing adapted to a gamma characteristic of a display device. Further, an object image photographed through the lens group 10 is sometimes degraded in image quality due to characteristics of the lenses. In general, examples of the degradation include distortion aberration in which a peripheral portion is distorted, chromatic aberration in which a color shift occurs in a radial direction, and decreased marginal illumination due to lens vignetting. The image processing mentioned here also includes processing for correcting these degradations of image quality according to the lens status when performing photographing. The distortion aberration can be corrected by performing geometrical deformation, while the chromatic aberration can be corrected by restoring each pixel by a color shift amount, and the decreased marginal illumination can be corrected by amplifying an image signal in a concentric direction. Further, the image processing mentioned here can also include correction processing for emphasizing object edges, noise reduction processing for reducing random noise, and so forth, so as to improve the quality of the image. The image subjected to these image processing operations is output to the recording processor 13 arranged at a latter stage.

On the other hand, in order as to generate an image to be output to the recognition section 25 that performs recognition processing, the recognition image processor 24 (image modification unit) arranged in parallel with the main image processor 23 performs image processing operations similar to those performed by the main image processor 23 on the image output from the image sensor section 11a to modify the image. However, in an object or scene to be recognized by the recognition processing, there is sometimes a brightness or gradation which makes it easy to perform recognition. For example, a black animal or the like tends to be increased in recognition accuracy by correcting the brightness to some extent, but on the other hand, a face of a person or the like tends to be lowered in a recognition rate if the light-dark contrast is low. For this reason, it is preferable that the recognition image processor 24 performs image processing operations different from those performed by the main image processor 23 according to a recognition target. The image processed by the recognition image processor 24 is input to the recognition section 25.

In the recognition section 25 (second recognition unit), a variety of kinds of recognition processing are performed. The recognition processing in the recognition section 25 may use a function of rule-based recognition, or a function of cascade recognition for sequentially recognizing a recognition target by weak discriminators connected in series (cascade-connected), or a function of performing recognition trained by machine learning for a discrimination boundary in a feature space. Further, the recognition processing in the recognition section 25 may use a function of discrimination using a neural network that has obtained coefficients of pooling layers by deep learning. In a case where the recognition section 25 performs object recognition, as a recognition target, there may be mentioned, by way of example, a specific object, such as a person, an animal, an artificial object, the sky, a road, or a signal, and an organ as part of the object, such as a hand, a leg, a skeletal structure, a head, or a pupil. Further, the recognition section 25 sometimes performs scene recognition for determining a type of scene in a captured image. Examples of a scene recognized by scene recognition include specific scenes which are frequently used, such as a day scene and a night scene, an indoor scene and an outdoor scene, sunset glow, a sports scene, and a portrait. Further, recently, there is an increase in cases where the recognition section 25 performs, as recognition processing, class classification of properties of an object, e.g. by determining whether an object is a person or an animal, whether an object is a male or a female, and whether an object is a child or an adult. This class classification also includes image classification for determining a type into which a main object in an image is classified, such as a person, an animal, a scene, a road, the sky, or a vehicle. As a result of these recognition operations, the recognition section 25 outputs a position of an object (coordinates within an image), presence/absence of an object, an identifier (ID) of a determined scene, an ID of a class of the object, and an ID of an image type, to the control arithmetic unit 16.

The digital camera 100 according to the present embodiment, which can switch the signal processor 12 between a recognition mode and a learning mode, will be described. More specifically, in the recognition mode, the digital camera 100 is capable of obtaining a recognition result using the recognition function, whereas in the learning mode, the digital camera 100 is capable of updating the recognition function of the signal processor.

First, the recognition mode will be described using a data flow inside the image sensor section 11 and the signal processor 12 appearing in FIG. 3. Note that the same internal components as those of the conventional image sensor section 11a and signal processor 12a in FIG. 2 are denoted by the same reference numerals, and redundant description is omitted. That is, out of the components shown in FIG. 3, description of the image capturing section 20, the IF section 21, the IF section 22, the main image processor 23, the recognition image processor 24, and the recognition section 25, denoted by the same reference numerals as those in FIG. 2, is omitted.

Figure 3:
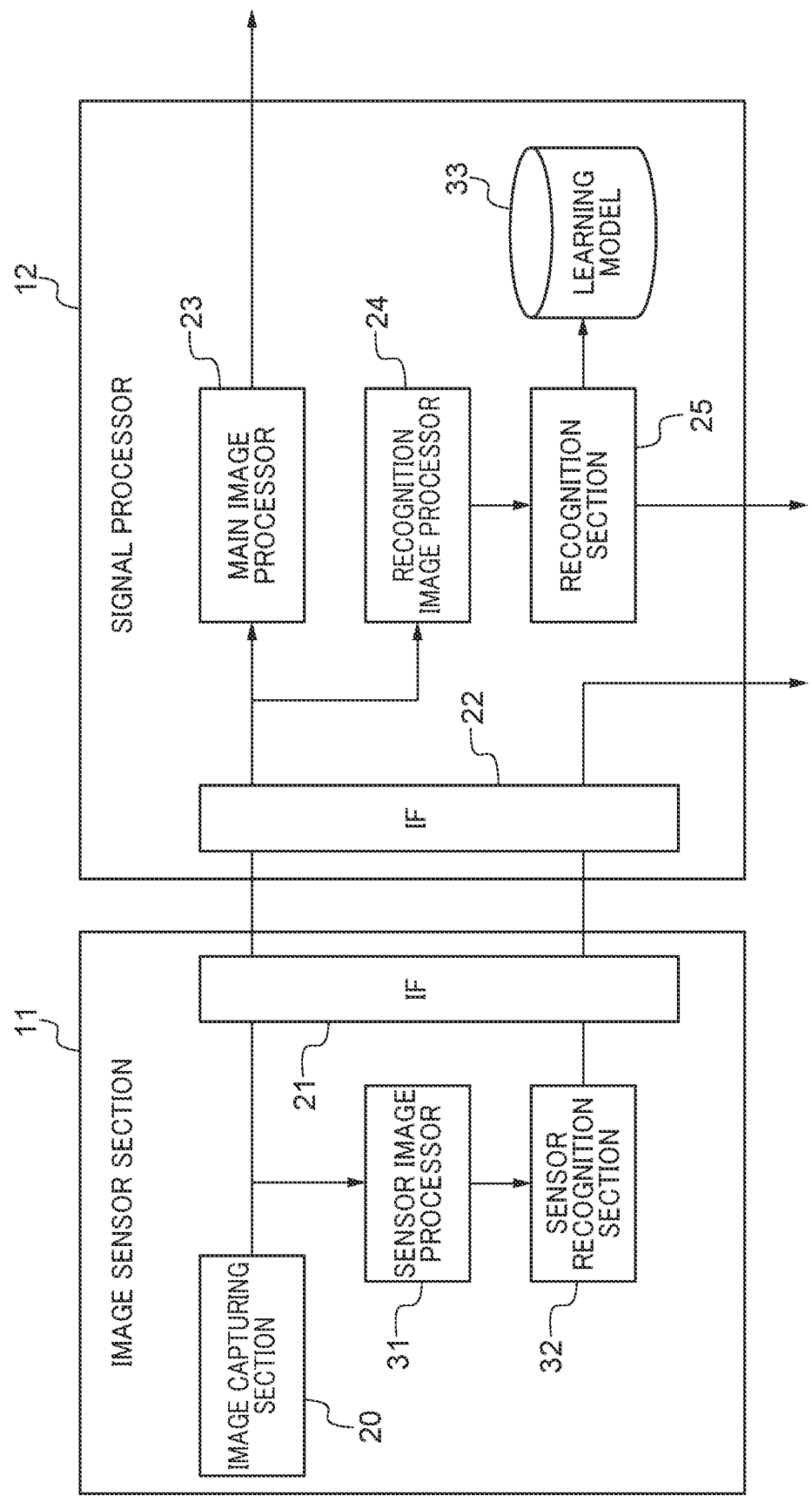
FIG. 3 is a diagram showing a data flow inside an image sensor section and a signal processor in a recognition mode in the first embodiment of the present invention.

As shown in FIG. 3, the image sensor section 11 is further provided with a sensor image processor 31 and a sensor recognition section 32. Further, the signal processor 12 is further provided with a learning model 33 connected to the recognition section 25. That is, in the present embodiment, the digital camera 100 has two recognition sections, i.e. the sensor recognition section 32 in the image sensor section 11 and the recognition section 25 in the signal processor 12.

A difference between the sensor recognition section 32 and the recognition section 25 will be described with reference to FIG. 4. The sensor recognition section 32 (first recognition unit) as the recognition section disposed in the image sensor section 11 is simpler in image processing performed immediately before recognition processing, and is smaller in the scale of a circuit for recognition, than the recognition section 25 as the recognition section disposed in the signal processor 12. Therefore, the sensor recognition section 32 is lower in recognition performance than the recognition section 25. On the other hand, in the image sensor section 11, it is possible to perform recognition by first reading out only lines necessary for recognition, and output a result of the recognition in the middle of the image, and hence the sensor recognition section 32 can perform recognition using a thinned image or a partial image without using the whole image. Therefore, time taken to obtain a recognition result by the sensor recognition section 32 is shorter than time taken to obtain a recognition result by the recognition section 25. Further, it is possible to output the recognition result obtained by the sensor recognition section 32 simultaneously with the whole image output from the image sensor section 11 to the outside without delay. Further, the sensor recognition section 32 can perform recognition not using the whole image but using a partial image differently from the recognition section 25, and perform recognition processing using the circuit having a scale smaller than that of the recognition section 25, and hence it is possible to make power consumption smaller than the recognition section 25. Further, the recognition section 25 and the sensor recognition section 32 have their respective circuits disposed at different locations, i.e. in the image sensor section 11 and the signal processor 12, and hence there is also a characteristic difference in portions where heat is generated when recognition processing is performed. When the image sensor section 11 and the signal processor 12 each separately have a recognition section, it is possible to make proper selective use of the respective recognition sections by making use of the characteristic features of them. For example, it is possible to provide a parallel recognition mode in which the sensor recognition section 32 and the recognition section 25 are simultaneously used in parallel by setting different recognition targets for the sensor recognition section 32 and the recognition section 25, respectively. Further, the recognition section 25 may be used when importance is placed on the recognition performance, and the sensor recognition section 32 may be used when importance is placed on lag of the recognition result. The recognition section 25 of the signal processor 12 may be used when it is desired to suppress heat generation in the image sensor section 11, and the sensor recognition section 32 may be used when it is desired to suppress power consumption of the whole digital camera 100. Thus, a variety of methods are envisaged for the proper selective use of the recognition section 25 and the sensor recognition section 32, but in the present embodiment, the method is not limited to a specific one.

Referring again to FIG. 3, when an image signal output from the image capturing section 20 is input to the sensor image processor 31, the sensor image processor 31 performs image processing for converting the received image signal to an image in a format which enables the sensor recognition section 32 to operate the recognition function. More specifically, the image output from the image capturing section 20 is a RAW image, and hence the sensor image processor 31 performs image processing for converting the RAW image to a YUV image and performing gamma conversion. Although the image processing performed by the sensor image processor 31 is basically the same as the image processing performed by the recognition image processor 24 in the signal processor 12, the scale of a circuit which can be disposed in the image sensor section 11 is limited, and hence the image processing performed by the sensor image processor 32 is limited to image processing simpler than that of the recognition image processor 24. Then, the image output from the sensor image processor 31 is input to the sensor recognition section 32. The sensor recognition section 32 performs the recognition processing. The recognition processing performed by the sensor recognition section 32 is similar to that performed by the recognition section 25 of the signal processor 12 and is not particularly limited. The sensor recognition section 32 performs the recognition processing, and a recognition result is output to the control arithmetic unit 16 via the IF sections 21 and 22. Although n FIG. 3, the recognition result is output to the control arithmetic unit 16 via the signal processor 12, there is no problem even when the recognition result is directly output to the control arithmetic unit 16 via the IF section 21.

As a difference from FIG. 2, the learning model 33 is provided inside the signal processor 12. The recognition section 25 performs recognition processing using the learning model 33 disposed in a memory (not shown) within the signal processor 12. The memory holding the learning model 33 may be a nonvolatile memory, or may be a volatile memory into which data is loaded from a nonvolatile memory at the start of energization of the signal processor 12 and is held during the energization time.

Then, the learning mode will be described referring to data in the image sensor section 11 and the signal processor 12 appearing in FIG. 5.

In the learning mode, the image sensor section 11 has the same configuration as the configuration in the recognition mode shown in FIG. 3. On the other hand, similar to the recognition mode shown in FIG. 3, in the learning mode, the signal processor 12 has the IF section 22, the main image processor 23, and the learning model 33. However, as shown in FIG. 5, in the learning mode, the signal processor 12 has a learning image processor 42 in place of the recognition image processor 24, a learning section 43 in place of the recognition section 25, and further has a recognition result correction section 40 and a recognition result buffer 41.

The recognition result obtained by the sensor recognition section 32 is input to the signal processor 12 via the IF sections 21 and 22, and is input to the recognition result buffer 41 via the recognition result correction section 40. On the other hand, an image output from the image capturing section 20 is input to the signal processor 12 via the IF sections 21 and 22, and is input to the learning section 43 after being subjected to the image processing by the learning image processor 42. Since distortion correction is not performed by the sensor image processor 31 as described above, a distorted image is used in the image sensor section 11. On the other hand, the learning image processor 42 in the signal processor 12 can perform complicated image processing and can perform geometrical deformation processing for coping with distortion aberration. In other words, a recognition result obtained by the recognition section 25 in a case where an image from the learning image processor 42 is input and a recognition result obtained by the sensor recognition section 32 have a difference corresponding to the geometrical deformation. To cope with this, the recognition result correction section 40 (correction unit) performs correction for changing, out of the recognition result obtained by the sensor recognition section 32, a recognition result portion associated with each position, changeable by the geometrical deformation, within an image, to a state after being subjected to the geometrical deformation. That is, the recognition result correction section 40 performs geometrical deformation at only predetermined coordinates, as the correction corresponding to the processing performed by the learning image processor 42. This makes it possible to obtain a recognition result by applying the recognition result obtained from the image before being geometrically deformed, to the image after being geometrically deformed.

Next, the learning image processor 42 in the signal processor 12 will be described. In general, in a field of recognition engineering, as a method of improving the recognition accuracy, a generation-type learning method has been made use of. The generation-type learning method is a method of supervised learning in which discriminators that take a deteriorated image into consideration are built, by using an image formed by subjecting an image for learning (learning image) to image processing (image deterioration processing) that lowers the recognition accuracy, e.g. by adding noise on purpose, whereby a learning result is obtained with high recognition accuracy. Also in the present embodiment, the learning image processor 42 performs image processing for deteriorating an image on purpose. For example, the learning image processor 42 may perform color change processing for shifting the white balance (WB) from a proper value on purpose to thereby generate a color image lowered in visibility. The learning image processor 42 may perform image processing (brightness change processing) for generating an image whose brightness is shifted from a proper brightness to under-brightness or over-brightness. Further, the learning image processor 42 may perform image processing for deteriorating a sense of resolution by performing blur processing on an image, and image processing (contrast decrease processing) for reducing the contrast by changing allocation of gradation of an image. Further, the learning image processor 42 may perform image processing in a direction in which lens aberration becomes more noticeable, i.e. geometrical deformation processing for more largely distorting the periphery, aberration addition processing for changing the color of each pixel so as to make the chromatic aberration on edges more noticeable, and image processing (light amount reduction processing) for reducing the light amount on edges of the image so as to make the vignetting noticeable, and so forth. As a matter of course, assuming random noise, the learning image processor 42 may perform image processing (noise addition processing) for adding noise components to the whole image. The image which has been lowered in recognition accuracy by these image processing operations is output from the learning image processor 42 and input to the learning section 43.

Next, the recognition result buffer 41 will be described. The recognition result buffer 41 (synchronization unit) is used to input a recognition result corrected by the recognition result correction section 40 to the learning section 43 in a state synchronized with an image output from the learning image processor 42 such that the image output from the learning image processor 42 is relevant to an image used by the sensor recognition section 32 to obtain the recognition result. That is, the learning image processor 42 performs complicated image processing including geometrical deformation, and hence it takes time to perform the image processing executed between inputting and outputting of an image, which generates a lag. For this reason, if the recognition result output from the sensor recognition section 32, which is corrected by the recognition result correction section 40, is directly input to the learning section 43, the input timing of the recognition results precedes the timing of inputting an image subjected to the image processing by the learning image processor 42 to the learning section 43. To prevent this, the recognition result buffer 41 holds the recognition results of images of a plurality of frames sequentially input from the recognition result correction section 40 in FIFO. With this, the recognition result buffer 41 inputs a recognition result of an image of a frame input to the recognition result buffer 41 at a timing earlier by the number of frames corresponding to the lag generated in the learning image processor 42 than timing at which the image of the current frame currently is input from the learning image processor 42, to the learning section 43, in synchronism with the image of the current frame. Note that here, the current frame refers to a frame subjected to processing by the learning image processor 42 and currently input to the learning section 43. Then, the learning section 43 (learning unit) performs machine learning using the recognition result obtained from the recognition result buffer 41 as teacher data in a state synchronized and associated with the image input from the learning image processor 42 and stores discriminators acquired as a result of the learning in the learning model 33. Here, the learning image processor 42 (image modification unit) may also be used as the recognition image processor 24 in the recognition mode, or may be configured as part of the recognition image processor 24, or may be configured as totally another image processing circuit. Further, the learning section 43 may be a circuit also used as the recognition section 25 in the recognition mode or may be configured as part of the recognition section 25 or may be configured as totally another circuit.

Further, as the learning method, any other method may be employed insofar as it is a method making it possible to update the learning model 33 which can be used by the recognition section 25. For example, a method of updating weights of pooling layers of a neural network using e.g. a maximum likelihood estimation method, a k-means clustering method, or an evaluation function may be used. By thus using the learning mode, it is possible to improve the recognition performance of an image captured by the image sensor section 11 while normally using the digital camera 100.

Next, a method of switching between the recognition mode and the learning mode will be described with reference to a mode switching process in FIG. 6.

Figure 6:
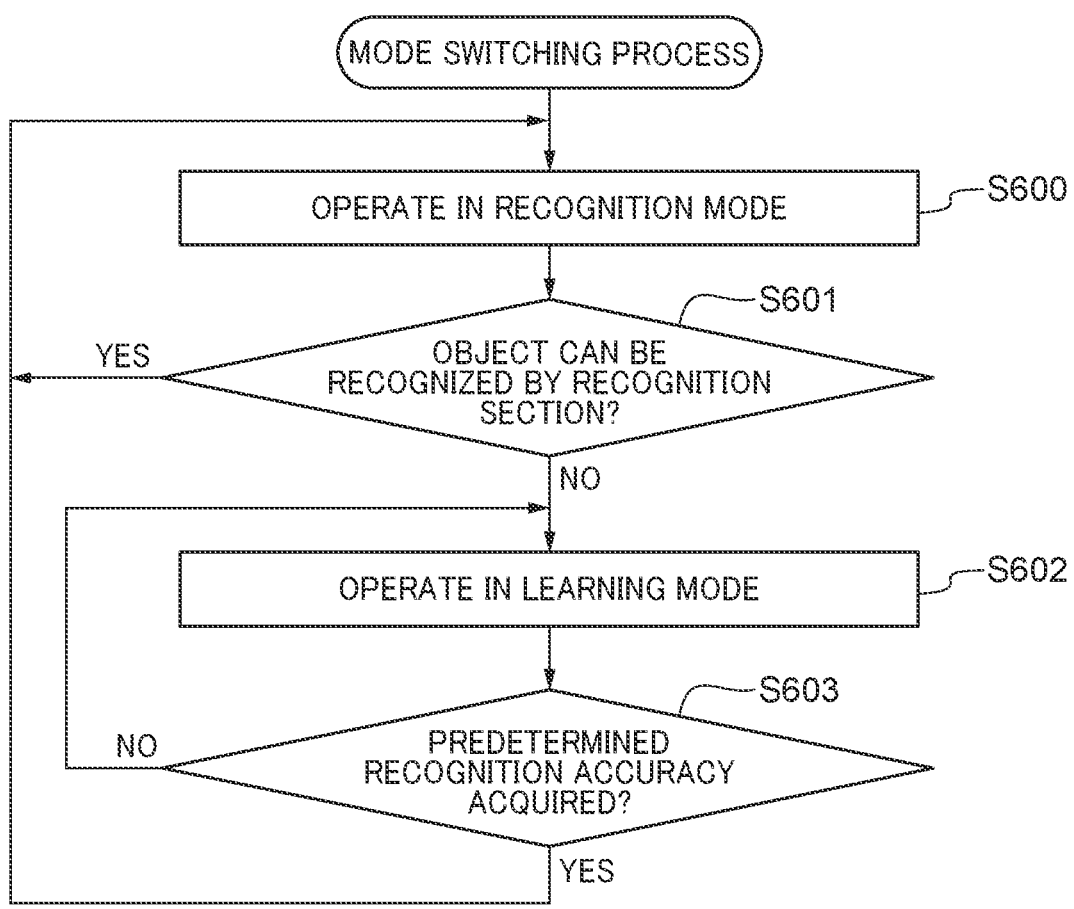
FIG. 6 is a flowchart of a mode switching process according to the first embodiment of the present invention.

FIG. 6 is a flowchart of the mode switching process according to the present embodiment. The present process is executed by the control arithmetic unit 16 (switching unit) that loads a program stored in a ROM (not shown) provided in the digital camera 100 into a RAM (not shown) similarly provided in the digital camera 100. The present process is started when the digital camera 100 is started up.

First, when the camera is started up, the operation is started in the recognition mode (step S600). The control arithmetic unit 16 determines, while causing the digital camera 100 to operate in the recognition mode, whether or not an object in a sequentially captured image, which can be recognized by the sensor recognition section 32, can be recognized by the recognition section 25 (step S601). If an object which can be recognized by the sensor recognition section 32 can be recognized by the recognition section 25 (YES to the step S601), the process returns to the step S600. On the other hand, if there is an object which cannot be recognized by the recognition section 25 (NO to the step S601), to add this object as an object which can be recognized by the recognition section 25, the signal processor 12 is switched to the learning mode, and the operation in the learning mode is started (step S602). Then, it is determined whether or not a predetermined recognition accuracy is acquired with respect to the object, and if it is determined that the predetermined recognition accuracy is not acquired (NO to the step S603), the process returns to the step S602 to repeat the learning in the learning mode, whereas if it is determined that the predetermined recognition accuracy is acquired (YES to the step S603), the process returns to the step S600 to resume the operation in the recognition mode. Determination on whether or not the predetermined recognition accuracy is acquired will be described hereinafter.

Figure 7:
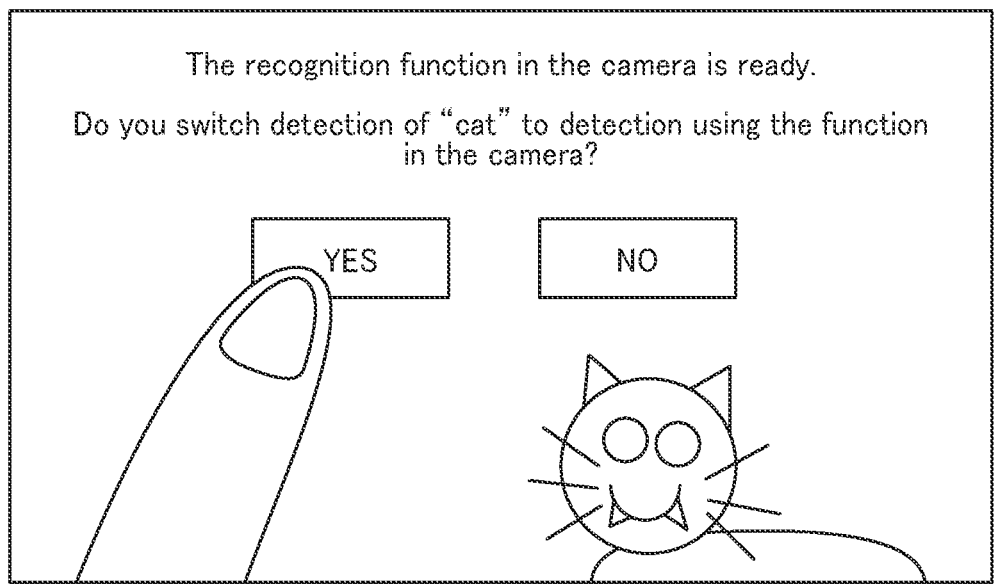
FIG. 7 is a diagram showing an example of a user interface for prompting a user to shift the mode to the learning mode in the first embodiment of the present invention.

Although in the mode switching process in FIG. 6, the process in which the digital camera 100 automatically switches between the recognition mode and the learning mode has been described, this is not limitative. For example, a user interface (UI) screen shown in FIG. 7 for prompting a user to shift the mode to the learning mode may be displayed on the display section integrally formed with the operation section 15, and the recognition mode and the learning mode may be switched when the user selects "YES" on the UI screen shown in FIG. 7 displayed on the operation section 15.

The determination in the step S603 on whether or not the predetermined recognition accuracy is acquired by the recognition section 25 of the signal processor 12 will be described in detail. Although this determination method is not particularly limited, for example, when the learning section 43 has learned input images including a predetermined number of images or more including a target object, it may be determined that the predetermined recognition accuracy is acquired. Further, as another method, after shifting to the recognition mode, recognition results obtained by the sensor recognition section 32 and the recognition section 25, respectively, in the recognition mode, may be compared with each other, and whether or not the predetermined recognition accuracy is acquired may be determined based on a result of the comparison. FIGS. 8 and 9 each show a table in which the recognition performance is compared between the recognition section 25 and the sensor recognition section 32. Here, a column of normal image quality indicates recognition results obtained in a case where an image photographed by the image capturing section 20 is directly input to the respective recognition sections. A column of under-brightness indicates recognition results obtained by the respective recognition sections in a case where an image photographed by the image capturing section 20 is processed by the sensor image processor 31 such that the brightness is reduced, and is processed by the recognition image processor 24 such that the brightness is reduced by the same degree. A column of over-brightness indicates recognition results obtained by the respective recognition sections in a case where an image photographed by the image capturing section 20 is processed by the sensor image processor 31 such that the brightness is increased, and is processed by the recognition image processor 24 such that the brightness is increased by the same degree. It is clear from the comparison in FIG. 8 that an under-brightness image can be correctly recognized by the sensor recognition section 32 (at a predetermined recognition accuracy) but cannot be correctly recognized by the recognition section 25. That is, the sensor recognition section 32 is higher in recognition accuracy than the recognition section 25, i.e. the learning has not progressed in the learning section 43 yet, and the recognition accuracy of the recognition section 25 has not reached a predetermined level. Further, it is clear from the comparison in FIG. 9 that not only an under-brightness image, but also an over-brightness image which cannot be correctly recognized by the sensor recognition section 32 can be correctly recognized by the recognition section 25. That is, it is possible to determine that the recognition accuracy of the recognition section 25 exceeds the level of the recognition accuracy of the sensor recognition section 32 and has reached a predetermined level. Thus, the shift from the learning mode to the recognition mode may be determined by determining an achievement level of the recognition accuracy of the recognition section 25.

Next, a second embodiment of the present invention will be described. When the learning in the learning section 43 has progressed, the recognition accuracy of the recognition section 25 exceeds the level of the recognition accuracy of the sensor recognition section 32 to cause a difference in performance between these two recognition sections, there occurs a case where it is difficult to make proper selective use of the recognition section 25 and the sensor recognition section 32. To cope with this, in the present embodiment, the configuration is made, as shown in FIG. 10, such that the learning model 33 used by the recognition section 25, which has improved in performance, can also be used by the sensor recognition section 32.

Figure 5:
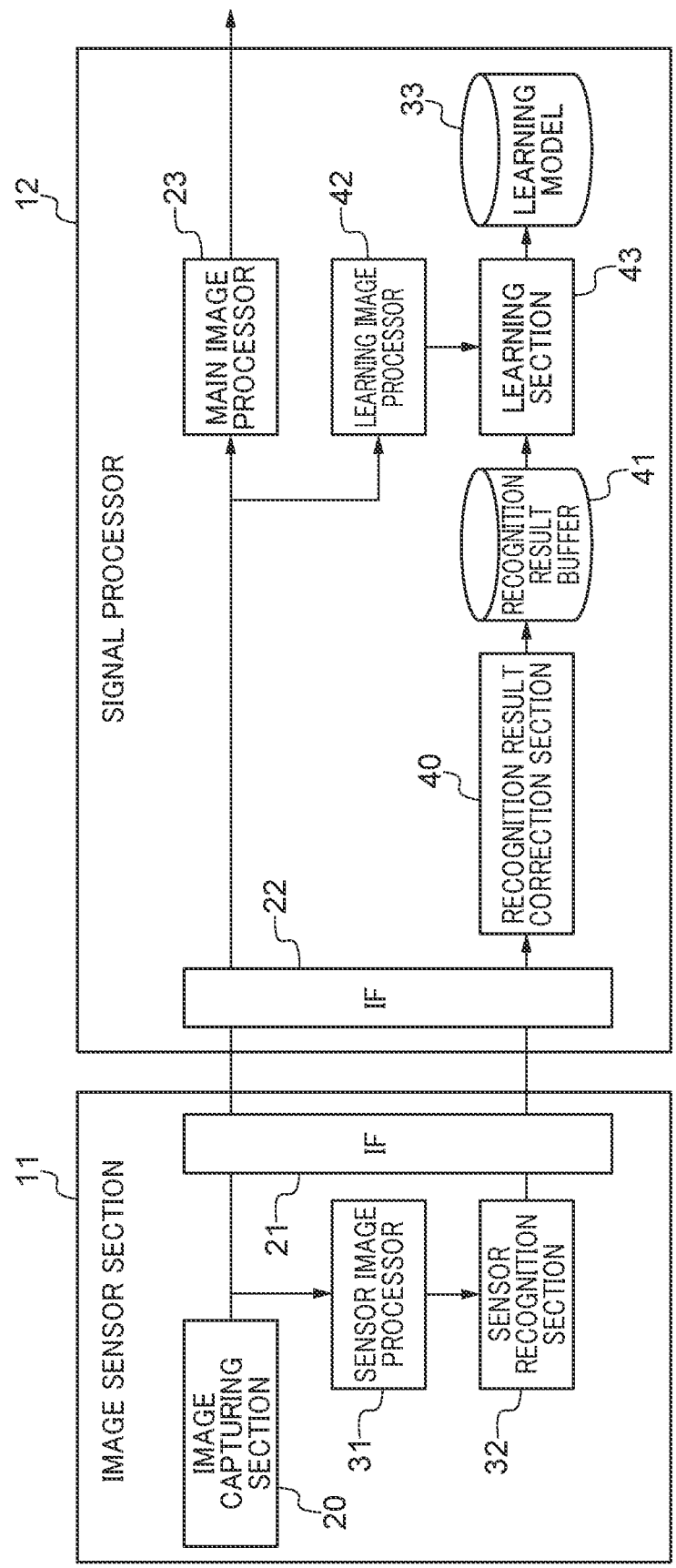
FIG. 5 is a diagram showing a data flow inside the image sensor section and the signal processor in a learning mode in the first embodiment of the present invention.

In the following description, the same internal components as those in the first embodiment, shown in FIG. 5, are denoted by the same reference numerals, and redundant description is omitted.

Figure 10:
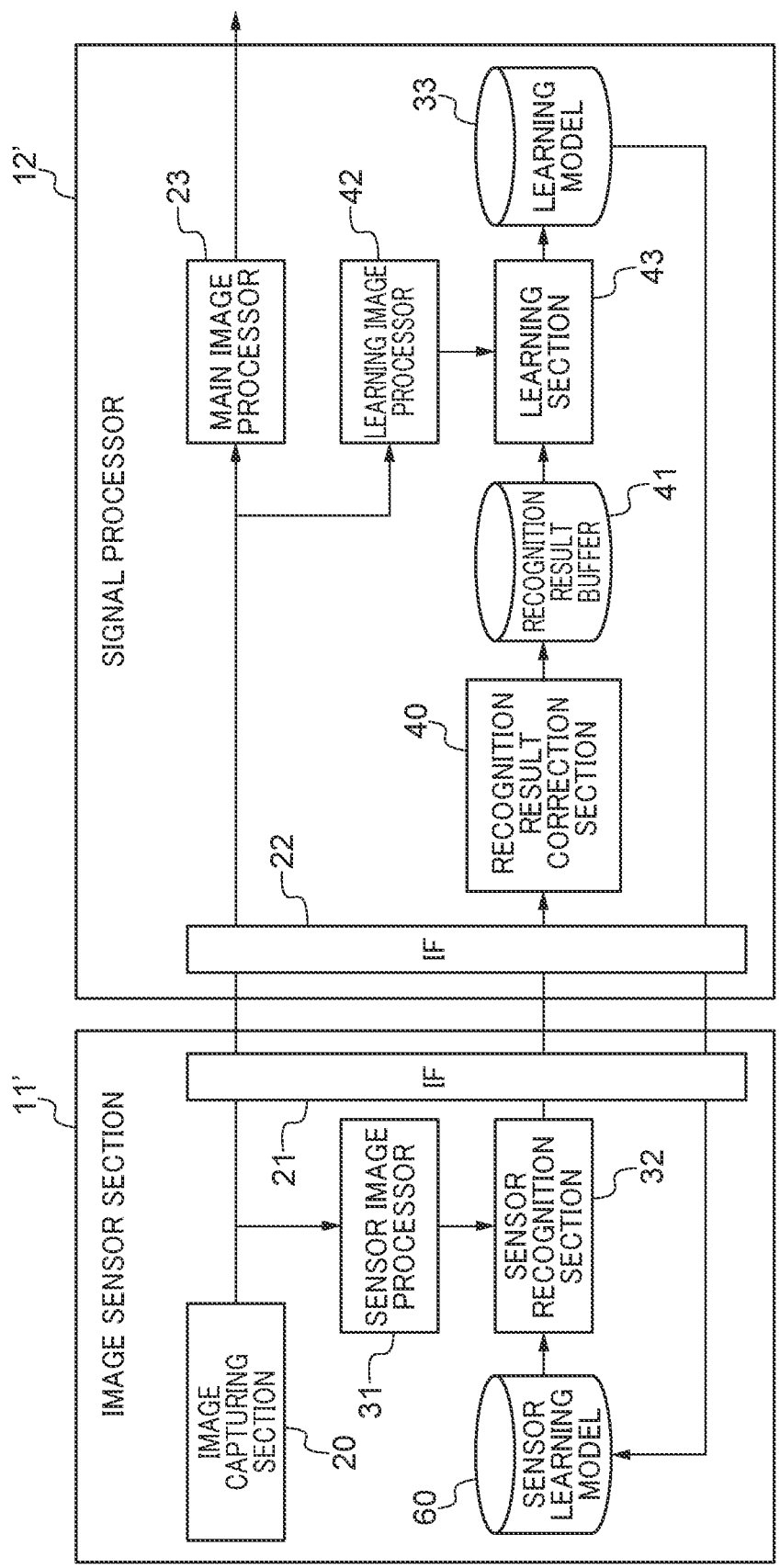
FIG. 10 is a diagram showing a data flow inside the image sensor section and the signal processor in the learning mode in a second embodiment of the present invention.

As shown in FIG. 10, an image sensor section 11' includes a sensor learning model 60 having a learning model in its internal memory area, and the sensor recognition section 32 performs recognition based on the sensor learning model 60. Then, the sensor learning model 60 is connected to the learning model 33 in the signal processor 12 via the IF sections 21 and 22, and is configured to be capable of importing discrimination parameters built in the learning model 33 and having reached a predetermined recognition accuracy to the sensor learning model 60. Here, the recognition section 25 and the sensor recognition section 32 may use a rule-based recognition function, or a function of cascade recognition for sequentially recognizing a recognition target by weak discriminators connected in series (cascade-connected), or a function of performing recognition trained by machine learning for a discrimination boundary in a feature space. However, the recognition section 25 and the sensor recognition section 32 are required to be compatible with each other such that discrimination parameters of the learning model 33 can be imported to the sensor learning model 60. For example, let it be assumed that the sensor recognition section 32 and the recognition section 25 include discriminators having the same configuration. In this case, by importing the discrimination parameters of the learning model 33 to the sensor learning model 60, it is possible to improve the performance of the sensor recognition section 32 to a level close to the recognition section 25.

As described above, although in the first and second embodiments, the digital camera 100 integrally formed with the lens group 10 has been described as the image capturing apparatus according to the present invention, by way of example, this is not limitative. For example, there is no problem even when the lens group 10 is a separate device which can be removably attached to the body of the digital camera 100. Further, the digital camera 100 may be implemented in another form, such as a smartphone having functions other than the camera.

The present invention has been described heretofore based on the embodiments thereof. However, the present invention is not limited to these embodiments, but it is to be understood that the invention includes a variety of forms within the scope of the gist of the invention. Further, it is possible to partially combine the embodiments on an as-needed basis.

The present invention includes a case where a program of software that realizes the functions of the above-described embodiments is supplied to a system or an apparatus having a computer that can execute the program, directly from a recording medium or using wired/wireless communication, and the system or the apparatus executes the program.

Therefore, a program code itself supplied to and installed in the computer to realize the functional processing of the present invention on the computer also realizes the present invention. That is, the computer program itself for realizing the functional processing of the present invention is also included int the present invention.

In this case, the program is not limited to a particular form, but insofar as it has a function of a program, it may be in any form, including an object code, a program executed by an interpreter, and script data supplied to an OS.

A recording medium for supplying the program may be e.g. a hard disk, a magnetic recording medium, such as a magnetic tape, an optical/magnetooptical storage medium, or a nonvolatile semiconductor memory.

Further, as a method of supplying the program, a method is envisaged in which the computer program implementing the present invention is stored in a server on a computer network, and a client computer connected to the server downloads and executes the computer program.

Note that in the present embodiment, the present invention can also be realized by supplying a program that realizes one or more functions to a system or a computer of an apparatus, and the system or a system controller of the apparatus performing a process for loading and executing the program. The system controller may have one or a plurality of processors or circuits, and may include a network of a plurality of separated system controllers or a plurality of separated processors or circuits, to load and execute an executable command.

The processor or circuit can include a central processing unit (CPU), a micro processing unit (MPU), a graphics processing unit (GPU), an application-specific integrated circuit (ASIC), and a field programmable gate array (FPGA). Further, the processor or circuit can include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-065101 filed Apr. 11, 2022, which is hereby incorporated by reference herein in its entirety.

What is claimed is:

1. An image capturing apparatus including an image sensor section and a signal processor configured to process an image input from the image sensor section via a signal line, comprising:
   a switching unit configured to switch the signal processor to one of a recognition mode and a learning mode,
   wherein the image sensor section includes:
   an image capturing unit configured to generate the image, and
   a first recognition unit configured to perform recognition processing based on the image,
   wherein the signal processor includes:
   a second recognition unit configured to perform, in the recognition mode, recognition processing by inputting the image input from the image sensor section to a learning model, and
   a learning unit configured to perform, in the learning mode, machine learning of the learning model based on a recognition result obtained by the first recognition unit and the image input from the image sensor section.

2. The image capturing apparatus according to claim 1, wherein the switching unit causes the signal processor to operate in the recognition mode when the image capturing apparatus is started, and at this time, in a case where an object which can be recognized by the second recognition unit is not included in the image input from the image sensor section, the switching unit causes the signal processor to operate in the learning mode until the second recognition unit acquires a predetermined recognition accuracy with respect to the object.

3. The image capturing apparatus according to claim 1, wherein the signal processor further includes an image modification unit configured to process the image input from the image sensor section, and inputs, when the signal processor is in the recognition mode, an image processed by the image modification unit to the second recognition unit.

4. The image capturing apparatus according to claim 3, wherein when the signal processor is in the learning mode, the signal processor inputs an image processed by the image modification unit to the learning unit.

5. The image capturing apparatus according to claim 4, further comprising a synchronization unit configured to enable the signal processor to input an image processed by the image modification unit and an image used by the first recognition unit to obtain the recognition result to the learning unit in a state synchronized and associated with each other such that these images are relevant to each other.

6. The image capturing apparatus according to claim 5, wherein the synchronization unit holds the recognition results of images of a plurality of frames sequentially input from the image sensor section in FIFO, and inputs a recognition result of an image of a frame input to the synchronization unit at a timing earlier by the number of frames corresponding to a lag generated in the image modification unit than timing at which the image of the frame is currently input from the image modification unit to the learning unit, to the learning unit, in synchronism with the image input from the image modification unit.

7. The image capturing apparatus according to claim 3, wherein the image modification unit performs, on the image input from the image sensor section, at least one image processing out of demosaicing processing, development processing, brightness correction processing, color correction processing, edge emphasizing processing, contrast correction processing, geometrical deformation processing, aberration correction processing, processing for correcting decreased marginal illumination due to vignetting, and gamma correction processing.

8. The image capturing apparatus according to claim 4, wherein when the signal processor is in the learning mode, the image modification unit further performs, on the image input from the image sensor section, at least one image deterioration processing out of color change processing for shifting white balance from a proper value, brightness change processing for shifting brightness from a proper value, blur processing, contrast decrease processing, geometrical deformation processing, aberration addition processing, light amount reduction processing for image edge, and noise addition processing.

9. The image capturing apparatus according to claim 4, wherein the signal processor further includes a correction unit configured to perform correction of a recognition result obtained by the first recognition unit, and wherein when the signal processor is in the learning mode, a recognition result obtained by the first recognition unit is input to the learning unit after being corrected by the correction unit.

10. The image capturing apparatus according to claim 9, wherein the correction by the correction unit corresponds to at least one image processing performed by the image modification unit.

11. The image capturing apparatus according to claim 9, wherein the correction by the correction unit is conversion corresponding to geometrical deformation processing performed by the image modification unit.

12. The image capturing apparatus according to claim 1, wherein the first recognition unit is smaller in at least one of a circuit scale and power consumption than the second recognition unit.

13. The image capturing apparatus according to claim 1, wherein the switching unit has a parallel recognition mode for causing the signal processor to operate in the recognition mode to cause a recognition result to be output from the second recognition unit, in parallel with causing the first recognition unit of the image sensor section to output a recognition result.

14. The image capturing apparatus according to claim 1, wherein recognition processing performed by the first recognition unit and the second recognition unit includes at least one of object recognition, scene recognition, class classification of an object, and image classification.

15. The image capturing apparatus according to claim 1, wherein the image sensor section updates a learning model of the first recognition unit with the learning model of the second recognition unit.

16. A method of controlling an image capturing apparatus including an image sensor section and a signal processor configured to process an image input from the image sensor section via a signal line, comprising:
  switching the signal processor to one of a recognition mode and a learning mode;
  generating the image in the image sensor section;
  performing recognition processing in the image sensor section based on the image;
  performing, when in the recognition mode, recognition processing in the signal processor by inputting the image input from the image sensor section to a learning model; and
  performing, when in the learning mode, machine learning of the learning model in the signal processor based on a result of recognition processing based on the image and the image input from the image sensor section.

17. A non-transitory computer-readable storage medium storing a program for causing a computer to execute a method of controlling an image capturing apparatus including an image sensor section and a signal processor configured to process an image input from the image sensor section via a signal line,
  wherein the method comprises:
  switching the signal processor to one of a recognition mode and a learning mode;
  generating the image in the image sensor section;
  performing recognition processing in the image sensor section based on the image;
  performing, when in the recognition mode, recognition processing in the signal processor by inputting the image input from the image sensor section to a learning model; and
  performing, when in the learning mode, machine learning of the learning model in the signal processor based on a result of recognition processing based on the image and the image input from the image sensor section.

* * * * *